US012248452B2

(12) United States Patent
Dentzer (10) Patent No.: US 12,248,452 B2
(45) Date of Patent: Mar. 11, 2025

(54) PROCESSING HIERARCHICAL RELATIONAL DATA

(71) Applicant: SAP SE, Walldorf (DE)

(72) Inventor: Ralf Dentzer, Hockenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/366,913

(22) Filed: Aug. 8, 2023

(65) Prior Publication Data

US 2025/0053549 A1 Feb. 13, 2025

(51) Int. Cl.
*G06F 16/22* (2019.01)
*G06F 3/0484* (2022.01)
*G06F 16/21* (2019.01)
*G06F 16/28* (2019.01)

(52) U.S. Cl.
CPC ........ *G06F 16/2246* (2019.01); *G06F 3/0484* (2013.01); *G06F 16/219* (2019.01); *G06F 16/284* (2019.01)

(58) Field of Classification Search
None
See application file for complete search history.

(56) References Cited

U.S. PATENT DOCUMENTS

| 11,449,198 | B2 | 9/2022 | Dentzer | |
| 2005/0114853 | A1* | 5/2005 | Glider | G06F 8/60 |
| | | | | 717/170 |
| 2011/0208781 | A1* | 8/2011 | Liu | G06F 16/25 |
| | | | | 707/E17.005 |
| 2014/0281873 | A1* | 9/2014 | Frew | G06F 16/00 |
| | | | | 715/229 |
| 2016/0078386 | A1* | 3/2016 | Herzog | G06Q 10/06316 |
| | | | | 705/7.26 |

OTHER PUBLICATIONS

Bernhard Westfechtel et al., "A Layered Architecture For Uniform Version Management", Dec. 2001, IEEE Transactions on software engineering, v.27, pp. 1111-1133 (Year: 2001).*
Bernhard Westfechtel et al., A Layered Architecture for Uniform Version Management, IEEE, No. 12, v.27, pp. 1111-1133 (Year: 2001).*
Wikipedia.org [online], "Persistent Data Structure" created on May 2004, retrieved on Jun. 22, 2023, retrieved from URL <https://en.wikipedia.org/wiki/Persistent_data structure>, 15 pages.

* cited by examiner

*Primary Examiner* — Taelor Kim
(74) *Attorney, Agent, or Firm* — Fish & Richardson P.C.

(57) ABSTRACT

The present disclosure relates to computer-implemented methods, software, and systems for processing hierarchies of data. A first changeable version of a current hierarchy of nodes is created to refer to a current stable version and to a first set of new relations associated with changes in a first set of relations between entities in the current stable version is response to a received first instruction. A second instruction to adjust the current stable version is received from a second user. In response to receiving the second instruction, a second changeable version of the current hierarchy of nodes is created. The second changeable version refers to the first changeable version and to a second set of new relations associated with changes in a second set of relations between entities in the first changeable version. A new stable version of a new current hierarchy of nodes is generated.

19 Claims, 8 Drawing Sheets

FIG. 1

| Parent Version | Parent Item | Child Item | Child Version |
|---|---|---|---|
| 1 |   | A | 1 |
| 1 | A | B | 1 |
| 1 | A | C | 1 |
| 1 | B | D | 1 |
| 1 | B | E | 1 |
| 1 | C | F | 1 |
| 1 | C | G | 1 |

FIG. 2A

| Version | Rank | Parent Rank | Parent Item | Child Item | Level | Tree Size | Post Order |
|---|---|---|---|---|---|---|---|
| 2 | 1 |   |   | A | 1 | 7 | 7 |
| 2 | 2 | 1 | A | B | 2 | 3 | 3 |
| 2 | 3 | 2 | B | D | 3 | 1 | 1 |
| 2 | 4 | 2 | B | E | 3 | 1 | 2 |
| 2 | 5 | 1 | A | C | 2 | 3 | 6 |
| 2 | 6 | 5 | C | F | 3 | 1 | 4 |
| 2 | 7 | 5 | C | G | 3 | 1 | 5 |

| Parent Version | Parent Item | Child Item | Child Version |
|---|---|---|---|
| 3 | | A | 3 |
| 3 | A | B | 3 |
| 3 | A | C | 2 |
| 3 | B | D | 3 |
| 3 | B | E | 2 |
| 3 | D | H | 3 |

PROCESSING HIERARCHICAL RELATIONAL DATA

TECHNICAL FIELD

The present disclosure relates to computer-implemented methods, software, and systems for data processing.

BACKGROUND

Software complexity is increasing and causing changes to lifecycle management and maintenance of software applications, databases, and platform systems. The volume of data generated by various applications and services has also grown rapidly. Processing and storing of data can be associated with a large amount of computer resources such as computing, storage, and network resources.

Hierarchical structures are a powerful way to organize, combine, and control huge amounts of data. Recursive parent-child hierarchies offer greatest flexibility to do so, however may be difficult to process in a relational database due to their recursive nature which prevents the use of efficient set operations. Certain hierarchical attributes can be added to each node in a hierarchy, for example, a reference to the level of the node in the hierarchy, the number of its descendants, its pre-order or post-order rank, among other properties. These hierarchical attributes can be leveraged by relational set operations to efficiently evaluate the hierarchical data. For example, such attributes can be used to aggregate information or perform analytical measures based on the hierarchical structure.

SUMMARY

Implementations of the present disclosure are generally directed to a computer-implemented method for processing hierarchies of data. One example method may include operations such receiving, from a first user, a first instruction to adjust a current stable version of a current hierarchy of nodes representing data entities, wherein the current stable version includes hierarchical attributes added to each of the nodes of the current hierarchy; in response to receiving the first instruction, creating a first changeable version of the current hierarchy of nodes, wherein the first changeable version refers to the current stable version and to a first set of new relations associated with changes in a first set of relations between entities in the current stable version; receiving, from a second user, a second instruction to adjust the current stable version of the current hierarchy of nodes; in response to receiving the second instruction, creating a second changeable version of the current hierarchy of nodes, wherein the second changeable version refers to the first changeable version and to a second set of new relations associated with changes in a second set of relations between entities in the first changeable version; and initiating generation of a new stable version for a new hierarchy as a modified version of the current hierarchy of nodes, wherein the generation of the new hierarchy comprises enforcing the first set and the second set of new relations to traverse the current stable version to generate the new stable version by (i) defining the new hierarchy of the nodes that is the modified version of the current hierarchy of the nodes and (ii) computing updated hierarchical attributes to be added to the nodes in the new stable version.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors and a computer-readable storage medium coupled to the one or more processors, having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

Additional example algorithms that can be implemented and executed in accordance with the present disclosure are depicted in the attached Appendix.

DETAILED DESCRIPTION

The present disclosure describes various tools and techniques for processing hierarchies of data.

In some instances, hierarchical structures for data maintained in a relational database can be maintained, where nodes of the hierarchy can refer to different data entities. In some instances, the hierarchical structures can be presented as tree structures. The high-level hierarchy levels (upper-level nodes that are closer to the root node) can be used to be presented at user interface of applications or related service so that users can perform data selection and filtering to perform data analytic tasks (e.g., generate reports based on invoked data from the data entities).

When hierarchical structures are prepared, different hierarchical attributes can be generated for the nodes in the structure to be used when executing relational set operations over the data entities. The hierarchical attributes can facilitate to efficiently evaluate the hierarchical data, for example aggregate information or analytical measures along the hierarchical structure. The attributes can depend on the complete hierarchy.

In some instances, the evaluation of hierarchies can be associated with different scenarios to analyze organization structure in different contexts and use cases, such as in enterprise frameworks, in environmental context related to consumption of energy, in analysis projects associated with evaluating nodes related to data defined for different project items, machines, vehicles, plants, sites, or other resources including men-power.

In some instances, to calculate the hierarchical attributes, the complete hierarchy is to be processed. The processing time scales with the size of the hierarchy due to hierarchical recursion. A small change of the hierarchy structure can invalidate the hierarchical attributes of all hierarchy nodes. Thus, if a change in the hierarchy is made, all hierarchical attributes should be re-calculated. In scenarios where hierarchies are both changed and evaluated, this re-calculation can severely impact user experience for big hierarchies of nodes. If the re-calculation takes time and resources, this can affect the possibility to evaluate the data and to use that for performing analytical tasks, since the hierarchy will be in a "not final" state without having a reference to a single true state for the time of the task execution.

In some instances, a possible work-around would be a fixed maintenance windows for hierarchy changes. However, this can create downtime for the service execution and may be associated with poor user experience.

In some instances and to overcome such drawback and with the aim of improving the data processing of hierarchies of data, versions of the hierarchy can be introduced in accordance with the present disclosure. In some instances, after the initial creation of the hierarchy, a version with correct hierarchical attributes can be maintained as available and can be used by data evaluations. Such a version can be called a stable version of the hierarchy. When changes to the hierarchy are made, those changes can be applied to another version of the hierarchy that can be called changeable. When a changeable hierarchy version is created, the differences with the stable version can be stored according to a relational model and the changeable hierarchy version can be associated with a preceding version or version which can be either a stable version or a previous changeable hierarchy version. In accordance with the present implementations, such approach of keeping version of the hierarchies can reduce the data volume that is stored to maintain the information for the data and can minimize the time for creation of a changeable hierarchy version: In some instances, it may be not necessary to fully copy the stable version to the new changeable version, but rather to refer to it.

In some instances, users can apply multiple changes to a changeable hierarchy version. For example, this can be necessary when bringing a hierarchy from one consistent state to a new one. When a change to the hierarchy is complete, a user can activate (initiate a modification of an updated stable version that includes the modifications requested) the changeable hierarchy version. By activating a changeable hierarchy version, an updated (or new) stable hierarchy version can be created that include updated hierarchical attributes that reflect the changed state. Once this creation process is finished, evaluations associated with queries for the data associated with the hierarchy is switched to use the new stable version, and the old stable version can be deleted or discarded.

In some instances, a stable version can be in a state available for modification, and if a changeable version of the hierarchy exists and it is not yet activated, the changeable version can be activated to trigger the new stable version generation. In some cases, a new changeable version can be created in the meantime that can refer to the previous stable version of the hierarchy. Based on generating such a new changeable version, the triggered generation of the new stable version can be stopped and a new process for a new stable version can be triggered that can incorporate the changes from the two new changeable versions. In some cases, a subsequent changeable version can include modifications related to a current stable version (there is only one version at a time) and/or to another preceding changeable version. In some cases, the changeable versions can be stored with reference number and priority to indicate the consequence of performing modifications. If a creation process for a new stable version is running and a new changeable version is created that references the changeable version being activated, one more changeable version can be generated to capture differences with respect to the referenced changeable version. The creation process of a new stable version can consider differences captured by the changeable version being activated as well as referenced changeable versions.

In some instances, hierarchy maintenance is a process executed to keep proper stable versions for a hierarchy and allowing data queries and evaluation to run smoothly while modifications to the hierarchy structure are made. The hierarchy maintenance can be based on actions to combine a hierarchy combined the latest changeable version, other changeable versions which it references recursively, as well as a referenced stable hierarchy version. When a change is requested, the maintenance process may not consider whether there have been changes that are not yet processes (or activated) but rather may allow to execute a change. Such subsequent changes even if a previous changeable version has not be activated to yield a new stable version may be allowed without the need for hierarchy attributes to be pre-calculated.

Figure 1:
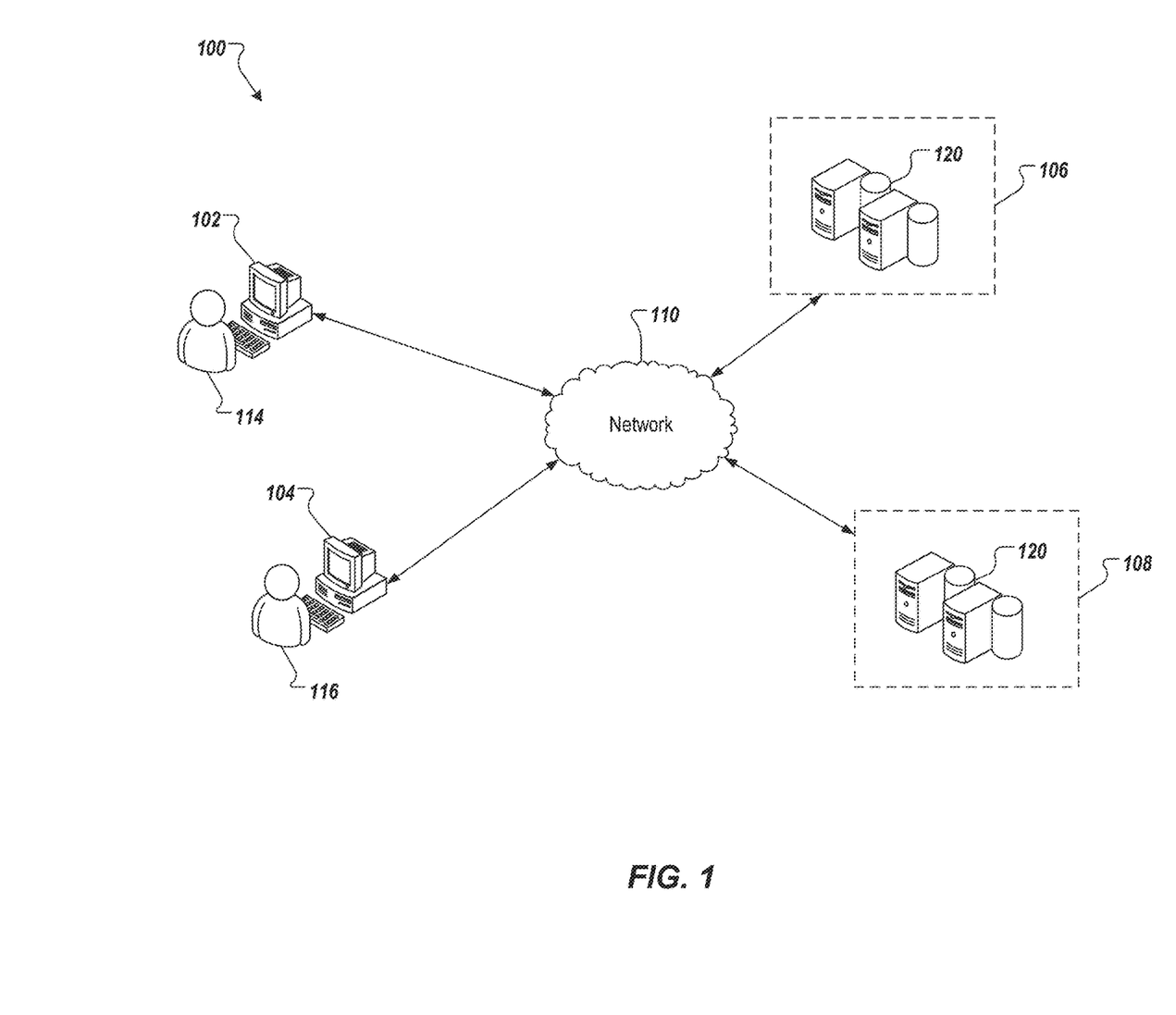
FIG. 1 is a block diagram depicting an example computer-implemented system that can execute implementations of the present disclosure.

FIG. 1 is a block diagram depicting an example computer-implemented system 100 that can execute implementations of the present disclosure. In the depicted example, the example system 100 includes a client device 102, a client device 104, a network 110, a computing environment 106, and a computing environment 108. The computing environment(s) 106 and/or 108 can be cloud computing environments that can include one or more server devices and databases (for example, processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the environment 106 (and/or the environment 108) can include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the environment 106 and/or the environment 108 can host applications and databases running on the host infrastructure. In some instances, the environment 106 can include multiple cluster nodes that can represent physical or virtual machines that can represent web node clusters. A hosted application and/or service can run on virtual machines (VMs) hosted on cloud infrastructure.

In some instances, the environment 106 and/or the environment 108 can provide infrastructure for hosting relation databases where data entities are stored and organized in hierarchies. The environments 106 and/or 108 can host applications or service that can support maintenance of hierarchies of data in accordance with implementations of the present disclosure.

In some instance, an interface can be exposed at the environment 106 and/or 108 that provides the possibility of users to work with hierarchies of data entities and maintain their status by maintaining stable and changeable versions of the hierarchies as explained throughout the present disclosure.

In some instances, user interfaces for displaying a stable hierarchy version. The presentation can leverage the hierarchical attributes to provide special information like the number of descendants of an item in the hierarchy, or aggregate information over the hierarchy structure. In some instances, user interfaces for changeable hierarchies may not leverage pre-calculated hierarchical attributes and therefore cannot offer these features with good performance. Display and maintenance of a hierarchy can be supported for users where a user can only see a limited number of items in the hierarchy and handle these by providing modifications, for example, by simple requests to the hierarchy relations and that can traversal along them when generating and activating a changeable version of the hierarchy.

In some instances, user interactions can be received at the user interface to perform operations over one or more version of a hierarchy of nodes representing data entities. For example, the user interactions can be associated with actions to be performed for the hierarchy such as those presented at Table 1.

TABLE 1

| User interaction | Performance consideration |
| --- | --- |
| Evaluate a hierarchy | Optimal execution due to hierarchical attributes No delay caused by hierarchy changes |
| Maintain a hierarchy | No delay caused by copying stable hierarchy version for maintenance, copying of hierarchy roots only Traversal of the hierarchy for UI display, user interactions with small data volume Changes lead to updates of a limited number of ancestors Small storage overhead caused by storing differences until these can be deleted |
| Activate a hierarchy | Processing time in the background during activation of a new stable version Temporary storage increase during activation of a new stable version until old stable version is deleted |
| Native execution by the database | Some database systems, for example SAP HANA, already offer native support for hierarchies, in particular for leveraging hierarchical attributes for the evaluation of a hierarchy Native execution by the database would also improve performance of other usages in particular Basic requests from a user interface hierarchy maintenance Activation of changeable hierarchy version |

Figure 2A:
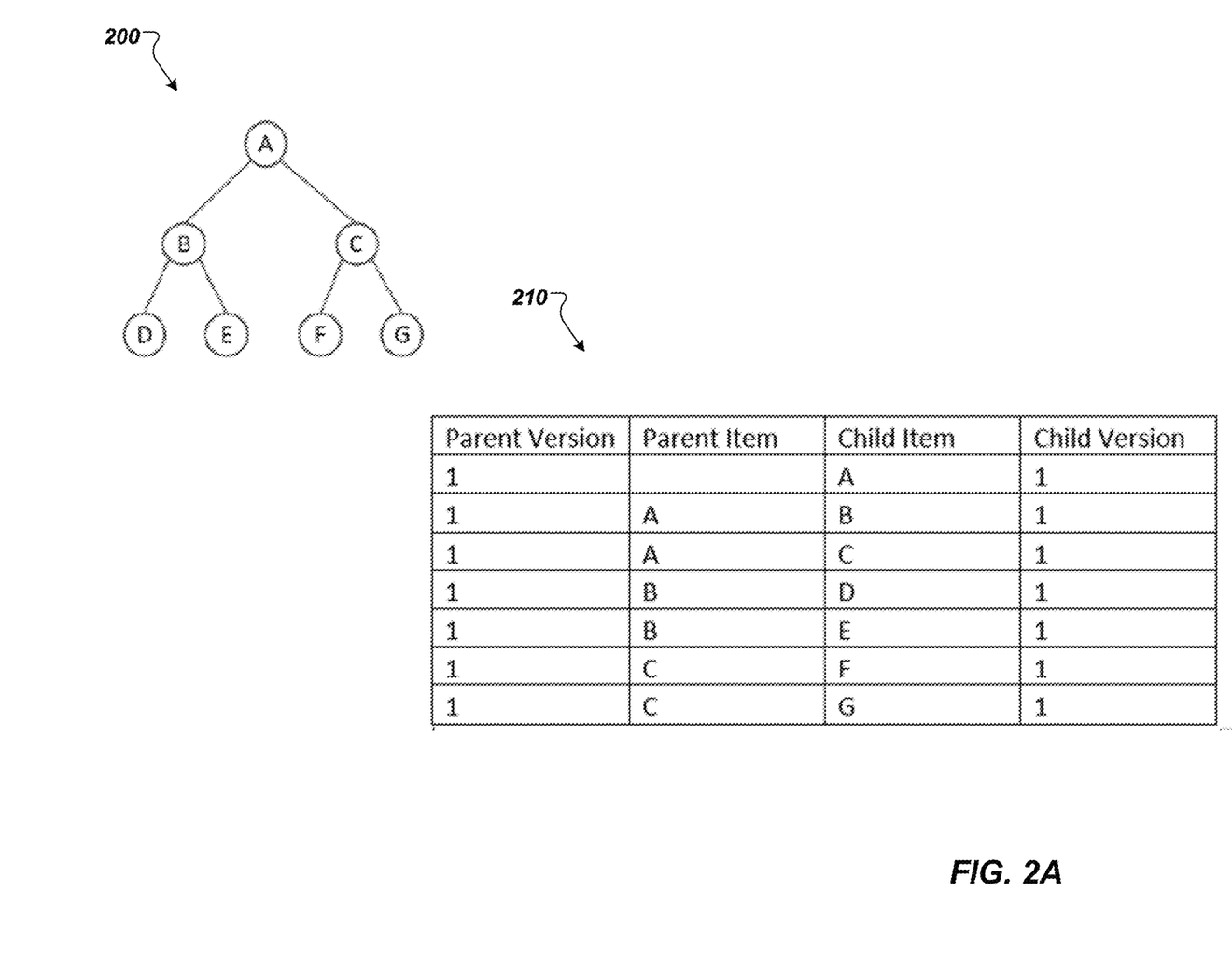
FIG. 2A is a block diagram of an example definition of a hierarchy of nodes defining data entities of a data structure stored in a relational database.

FIG. 2A is a block diagram of an example definition of a hierarchy of nodes defining data entities of a data structure stored in a relational database.

Different data entities can be arranged in hierarchical structures. That can be tables, records, object, or other types of entities. In some instances, a relational data model can be defined for a hierarchical structure of nodes that correspond to data entities, which can be referred also as items. The data entities or items can be identified by an identifier.

In some instances, a hierarchy of entities can be associated with a respective version where information about the version can be stored according to the relational data model, and data about data items is also stored according to a data model. For example, the relational data model of a data entity of a hierarchy can be represented as shown at Table 2 below.

TABLE 2

| Item HierarchyVersion | |
| --- | --- |
| Key HierVersionID | Identifies a hierarchy version |
| HierType | Type of the hierarchy version: stable or changeable |
| HierStatus | Status in the lifecycle of a version |
| RefHierVersion | A referenced version. This version stores differences to the referenced version |
| SourceHierVersion | Changeable version from which a stable version is derived |

In accordance with the present implementations, a hierarchy structure can be maintained for a changeable hierarchy. Such version of the changeable hierarchy may refer to a stable hierarchy version and may defined parent and child node relationships between the data entities in the hierarchy. The relations can define a changeable hierarchy that can be associated with multiple versions of the hierarchy, e.g., a stable version and/or one or more changeable hierarchies. For example, a relational data model for storing data for a data entity from a changeable hierarchy can be presented as shown at Table 3 below.

TABLE 3

ChangeableHierarchyItemRelation

| | |
|---|---|
| Key ParentKierVersionID | Hierarchy version of the parent item |
| Key ParentItemID | Parent item |
| Key ChildItemID | Child item |
| ChildHierVersionID | Hierarchy version of the child item |

The ChildHierVersion ID attribute of the data model may be not a key attribute. The data model can ensure that a parent item in a given parent version may not have multiple relations to the same child item. A root data entity in a hierarchy can be defined as a child data entities (node) without a parent. In some instances, root nodes of a hierarchy can be represented by a hierarchy relation having the root node as a child node and an undefined or initial parent item.

In some instances, a hierarchy of data entities (items) A, B, C, D, E, F, and G can be defined as shown in FIG. 2 at hierarchy 200. When a stable hierarchy version is defined, parent to child relations can be defined. A pre-order or hierarchy rank can be used as a key identifier in a data model for such a stable version. In some instances, the hierarchy 200 can be represented in a tabular form as in Table 210 to represent the parent and child relationships in the hierarchy 200. A relation data model such as the data model of Table 4 below can be used to define a relation between data entities in a stable hierarchy version.

TABLE 4

StableHierarchyItemRelation

| | |
|---|---|
| Key HierVersionID | The hierarchy version to which the relations belong to |
| Key HierRank | Pre-order rank |
| HierParentRank | Pre-order rank of the parent item |
| ParentItemID | Parent item |
| ChildItemID | Child item |
| . . . | Various hierarchical attributes |

In some instances, the data model of a stable hierarchy version can be optimized for consumption when executing queries related to data entities from the hierarchy. The hierarchy pre-order rank can define the ordinal number of a depth-first hierarchy traversal in a defined sibling order, for example, the lexicographic order of the identifiers of the data entities from the hierarchy. Such attribute can be used as a key to uniquely identify the entities in the particular version. The parent-to-child relation can be given by the parent and child item IDs as well as by the rank and parent rank attributes.

Figure 2B:
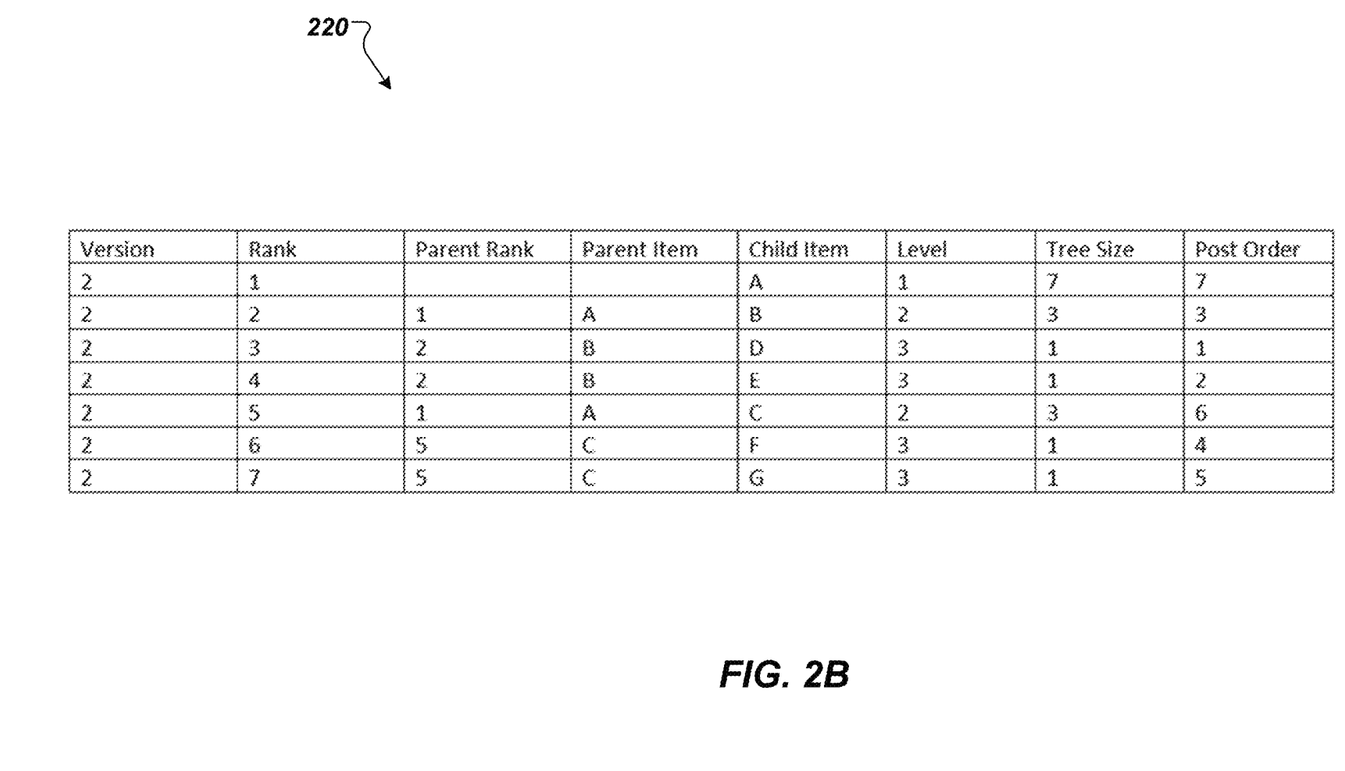
FIG. 2B is a block diagram of an example stable hierarchy version of a hierarchy that that can be modified based on requests to generate an update stable hierarchy version in accordance with implementations of the present disclosure.

FIG. 2B is a block diagram of an example stable hierarchy version of a hierarchy 220 that that can be modified based on requests to generate an update stable hierarchy version in accordance with implementations of the present disclosure. The stable version of the hierarchy 200 of FIG. 2A can be presented as a changeable hierarchy as shown at 220, where additional hierarchical attributes can be added, such as, hierarchy level, size of the sub-tree, and the post-order rank. The changeable version of the hierarchy as shown at FIG. 2B can include or refer to the stable version and further include a delta of the changes made to the stable version (e.g., add a new node).

In some instances, a changeable hierarchy can be defined to refer to the stable version and to include further changes, where when the changeable hierarchy is activated, a new stable version can be determined. The activation of one changeable hierarchy can be associated with triggering the activation of other changeable hierarchies, for example, where those are version that precede the current changeable version and have not yet been actives.

Figure 2C:
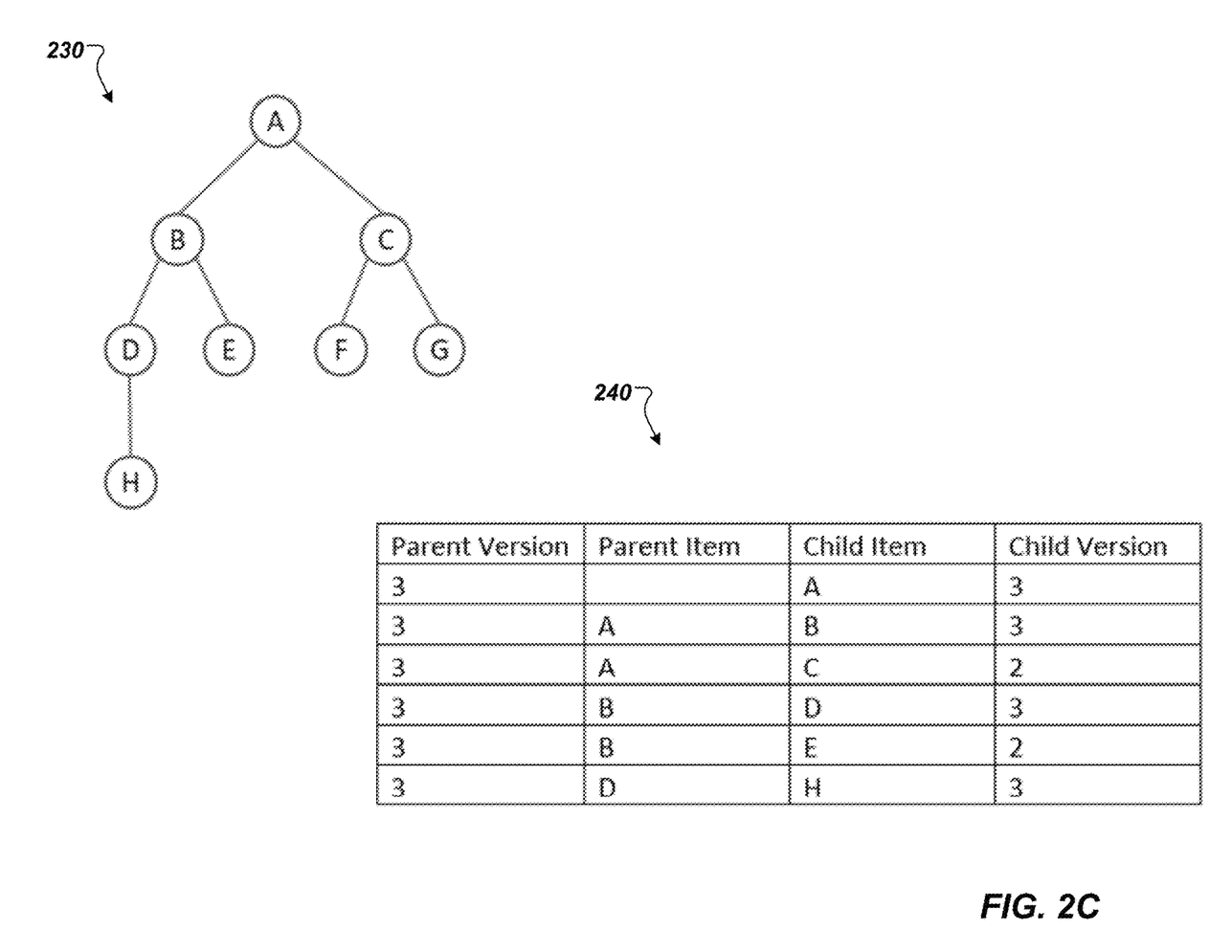
FIG. 2C is a block diagram of an example modification of a hierarchy that triggers a generation of a changeable hierarchy version in accordance with implementations of the present disclosure.

FIG. 2C is a block diagram of an example modification of a hierarchy 230 that triggers a generation of a changeable hierarchy version in accordance with implementations of the present disclosure.

In some instances, a user may request to add a new node H below node D in the stable hierarchy of version 2 as shown at FIG. 2B. The change can be as presented at 230. The change includes an insertion that when performed can trigger the generation of a changeable hierarchy version 3 as shown at table 240 of FIG. 2C. All changes to a hierarchy can be expressed as new relations. The new relations are be combined with the already existing relations and traversed depth-first, starting from the root nodes of the changeable hierarchy version that are being activated. During a traversal while executing a change activated based on a changeable hierarchy version, hierarchical attributes are calculated, for example, the hierarchy rank.

In some instances, the execution of the traversal can be performed according to the steps as shown at Table 5.

TABLE 5

Start with root item (3, A) - rank 1
Go to first child (3, B) - rank 2
Go to first child (3, D) - rank 3
Go to first child (3, H) - rank 4
Store information on H and go back to parent (3, D)
Store information on D and go to next sibling (2, E) - rank 5
Store information on E and go back to parent (3, B)
Store information on B and go to next sibling (2, C) - rank 6
Go to first child (2, F) - rank 7
Store information on F and go to next sibling (2, G) - rank 8
Store information on G and go back to parent (2, C)
Store information on C and go back to parent (3, A)
Store information on A In some instances, a full traversal back to roots may be necessary to determine and store hierarchy attributes for a new stable structure (e.g., the post-order or the tree size). This traversal can be implemented by a recursively called procedure as shown at Table 6. In some instances, only relations between nodes that traversed are included in the new stable hierarchy (version 4 in this example). The different hierarchy versions (changeable version) used in the traversal may be no longer needed and discarded in the data model of the stable hierarchy version.

In some instances, hierarchy changes can be associated with a type such as:

Insertion of an data entity in the hierarchy as a child of a node in the hierarchy, or as a new root item Deletion of a node in the hierarchy, which is associated with modifying a parent-child relation.

Move of a node in the hierarchy to a new parent node, that is also associated with a modification of a parent-child relation.

TABLE 6

Traversal Algorithm for Creating a Stable Hierarchy Version

Input to the algorithm
   A changeable hierarchy version in lifecycle status InActivation which hold the latest changes
   A stable hierarchy version in lifecycle status InActivation which shall hold the complete
   optimized hierarchy version
Context
   Information on the changeable version, in particular its referenced version
   Information on all recursively referenced hierarchy versions
   Relations of the changeable and all recursively referenced hierarchy versions
Output of the algorithm
   New stable hierarchy version including hierarchical attributes
Algorithm
   Initialize hierarchical attributes, for example the hierarchy rank with 0.
   Select all root relations of the changeable hierarchy version and process them in the defined
   order as follows
      Increase hierarchy rank by 1
      Optionally adjust further hierarchical attributes
      Initialize further hierarchical attributes, for example the tree size with 1
      Set first attributes of a stable relation
         Hierarchy version
         Hierarchy rank
         Parent rank = 0
         Parent item
         Child item
         Optionally other attributes that are known before traversing descendants
      Call the recursive hierarchy traversal procedure and pass as parameters
         Input: child version and child item of the root relation
         Input/output: hierarchy rank
         Optionally other attributes, for example the hierarchy tree size and the
         hierarchy post rank
      Increase the hierarchy post rank received from the procedure by 1
      Set the remaining attributes of the stable relation
         Hierarchy post rank
         Hierarchy tree size
      Insert the stable relation to the database table In some instances, a deletion and move as modification operation performed for a hierarchy can be quite powerful operations as they impact the complete sub-tree of the deleted or moved item. A stable hierarchy version(s) should not be changed before a new stable hierarchy version is generation, thus any of these change operations shall be expressed by additional relations in a changeable hierarchy version. When defining the modification in the context of modified, relations, a lifecycle status of the hierarchy version may be relevant in the context of the change.

Lifecycle Status of a Hierarchy Version

In some instances, the following lifecycle status can be defined for a stable version generated for a hierarchy as shown at Table 7.

TABLE 7

| Version Type | Lifecycle Status | Explanation |
| --- | --- | --- |
| Stable | Outdated | A more recent stable version exists |
| Stable | Active | Stable version used by evaluations |
| Stable | InActivation | A stable version is just being created |
| Changeable | Open | Available for changes |
| Changeable | InActivation | A stable version is just being created from it |
| Changeable | Activated | A stable version was created from it |

In some instances, when hierarchy change operations are performed, they refer to a previous hierarchy version, which can have a status (e.g., active, open, in activation, or else). The status may define the state of the modification and the status of its application the current stable version. When changes to hierarchy version are made, appropriate locking mechanisms for hierarchy changes can be implemented. For example, depending on the status, different preparations are made:

Status Open: the open changeable version will be used for storing the relations representing the new change operations.
   Status Active: a new changeable version is created in status Open with a reference to the active stable version.
   Status InActivation: a new changeable version is created in status Open with a reference to the version in status InActivation.

In status Active and InActivation, the root node relations can be copied from a referenced hierarchy versions (be that the current stable hierarchy version and/or a changeable hierarchy version) and stored in the new changeable version with a new version identifier (ID) as a parent version.

As shown at FIG. 2C, a change with reference to a stable hierarchy version (e.g., version 2) can be made. To capture that, a new changeable hierarchy (version 3) can be created and the root relation for node A can be copied from the stable hierarchy version (i.e., version 2). Additionally, the parent version for the changeable hierarchy version can be set to 3. This step results in the following relation as shown at Table 8.

TABLE 8

| ParentVersion | ParentItem | ChildItem | ChildVersion |
| --- | --- | --- | --- |
| 3 | | A | 2 |

Anchor Relation of a Change

All changes that are made to a given hierarchy version can be expressed as new relations that can later be combined with other hierarchy versions and traversed. By copying and adapting the root relations, the starting points of the traversal are under control of the new hierarchy version, but for the nodes lower in the hierarchy to the starting points, the relations of the old hierarchy versions would be traversed, instead of the new changes. Therefore, the path from the roots to the anchor relations of the changes is to be copied to the new hierarchy version and adapted. The anchor relations of basic changes can be defined as follows:

Insertion: relations having the parent item of the inserted item relation as child item.

Deletion: relations having the parent item of the deleted item relation as child item.

Move: relations having the old parent item or the new parent item of the moved relation as child item.

As the relations on the path are all considered for the new hierarchy version, other child nodes of parent nodes on the path may be excluded from processing. Therefore, all other relations with parent nodes on the path can be copied to the new hierarchy version and their Parent Version can be adjusted to the new version. In accordance with implementations of the present disclosure, the new hierarchy version can reuse further relations of the previous versions without having to copy them.

In the example of a modification as shown at FIG. 2B, a new node H is inserted as child node to node D. Thus, the anchor is the relation (B, D). The relation (A, B) lies on the root path as well as the root relation itself (, A). All these relations can be added to the new version 3 as shown at Table 9.

TABLE 9

| ParentVersion | ParentItem | ChildItem | ChildVersion |
|---|---|---|---|
| 3 |  | A | 3 |
| 3 | A | B | 3 |
| 3 | B | D | 3 |

It should be noted that the root relation (, A) already existed but the ChildVersion is updated to the new version 3 to properly connect the path. Relations of siblings in the path are copied and their Parent Version adapted to the new version 3 as further shown at Table 10.

TABLE 10

| ParentVersion | ParentItem | ChildItem | ChildVersion |
|---|---|---|---|
| 3 | A | C | 2 |
| 3 | B | E | 2 |

Applying Changes to a Hierarchy Such as Inserting, Deleting, or Moving a Node

In some instances, for an insertion of a new node, a new relation is added below the anchor relation. For a deletion of an existing node, the relation to the deleted node can be omitted from the new hierarchy version. For a move of a node from one parent to another (or from a branch to another), the path preparation step can be executed where the old relation can be copied and can set the Parent Version to the new version. Additionally, the ParentItem can be changed to the target node of the move.

For example, an insertion of a new node (node H) as a child node of node D may be represented by the following relations as shown at Table 11.

TABLE 11

| Origin | ParentVersion | ParentItem | ChildItem | ChildVersion |
|---|---|---|---|---|
| Root + Path | 3 |  | A | 3 |
| Path | 3 | A | B | 3 |
| Path | 3 | B | D | 3 |
| Sibling | 3 | A | C | 2 |
| Sibling | 3 | B | E | 2 |
| Insert | 3 | D | H | 3 |

Figure 2D:
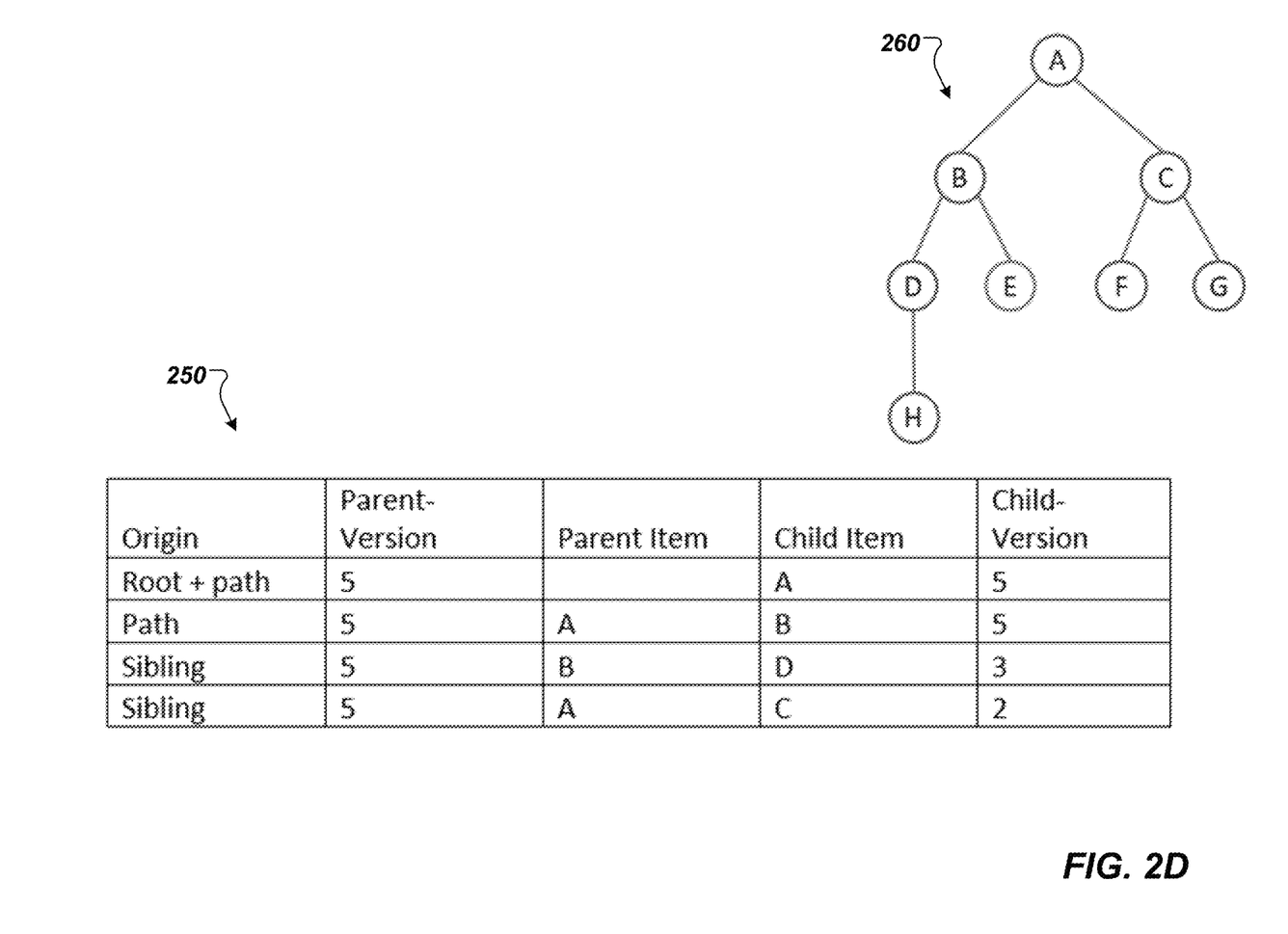
FIG. 2D is a block diagram of an example modification of a hierarchy to delete a node.

FIG. 2D is a block diagram of an example modification of a hierarchy to delete a node. In the hierarchy 260, a modification can be made to delete node E from the parent B in a new hierarchy version. It can be assumed for the sake of the example, that a hierarchy version 3 as previously discussed and presented at Table 10 can be in a lifecycle status "InActivation" so that a new version 5 with a reference to version 3 can be used to capture the change of the deletion, as shown at table 250.

Figure 2E:
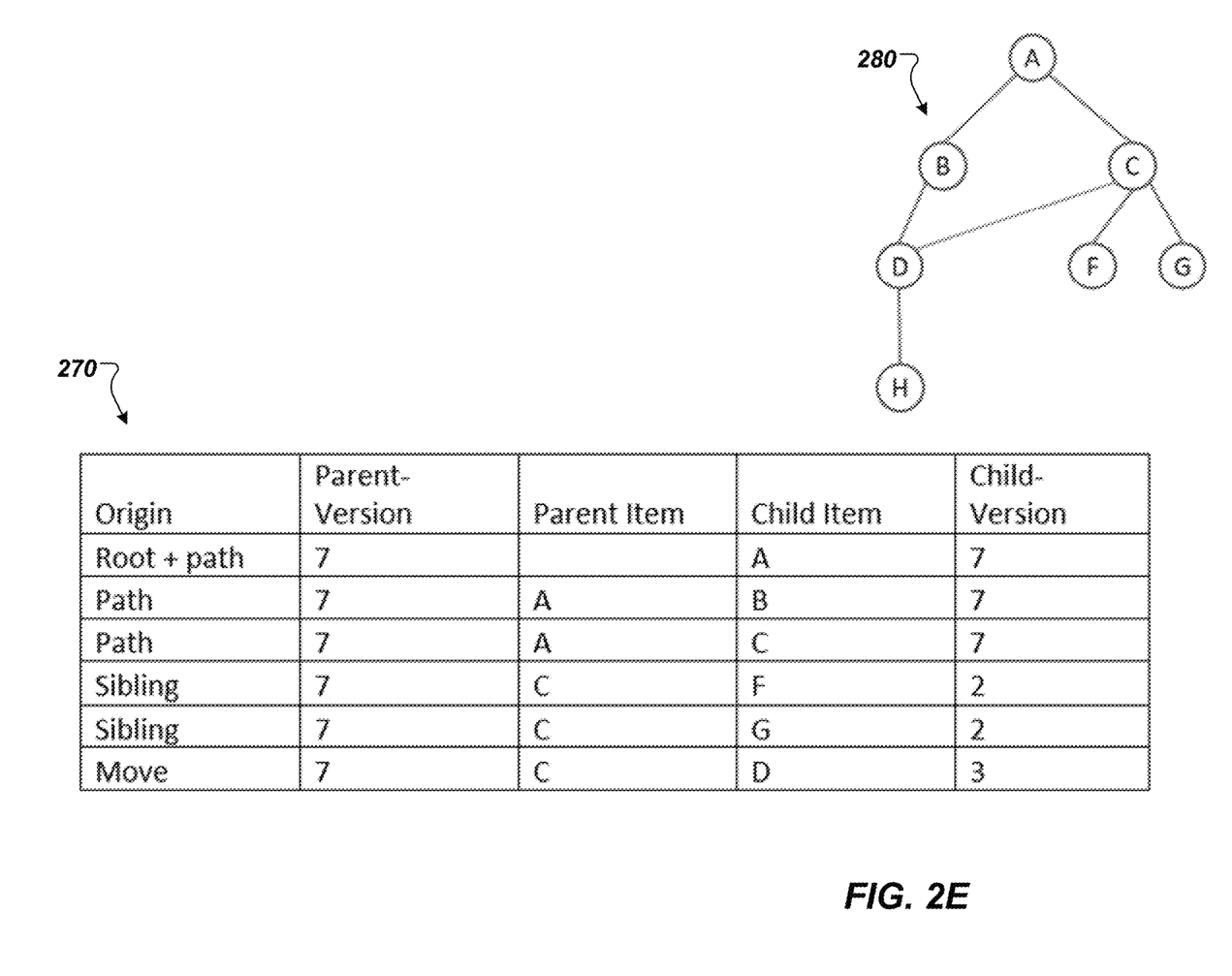
FIG. 2E is a block diagram of an example modification of a hierarchy to re-position a branch of nodes within the hierarchy.

FIG. 2E is a block diagram of an example modification of a hierarchy 280 to re-position a branch of nodes within the hierarchy. In some instances, a node D can be requested to be modes to a new parent node C in a new hierarchy version 7, which can refer to version 5. The mode of the node D can be represented in a changeable hierarchy version as shown at table 270.

Figure 3:
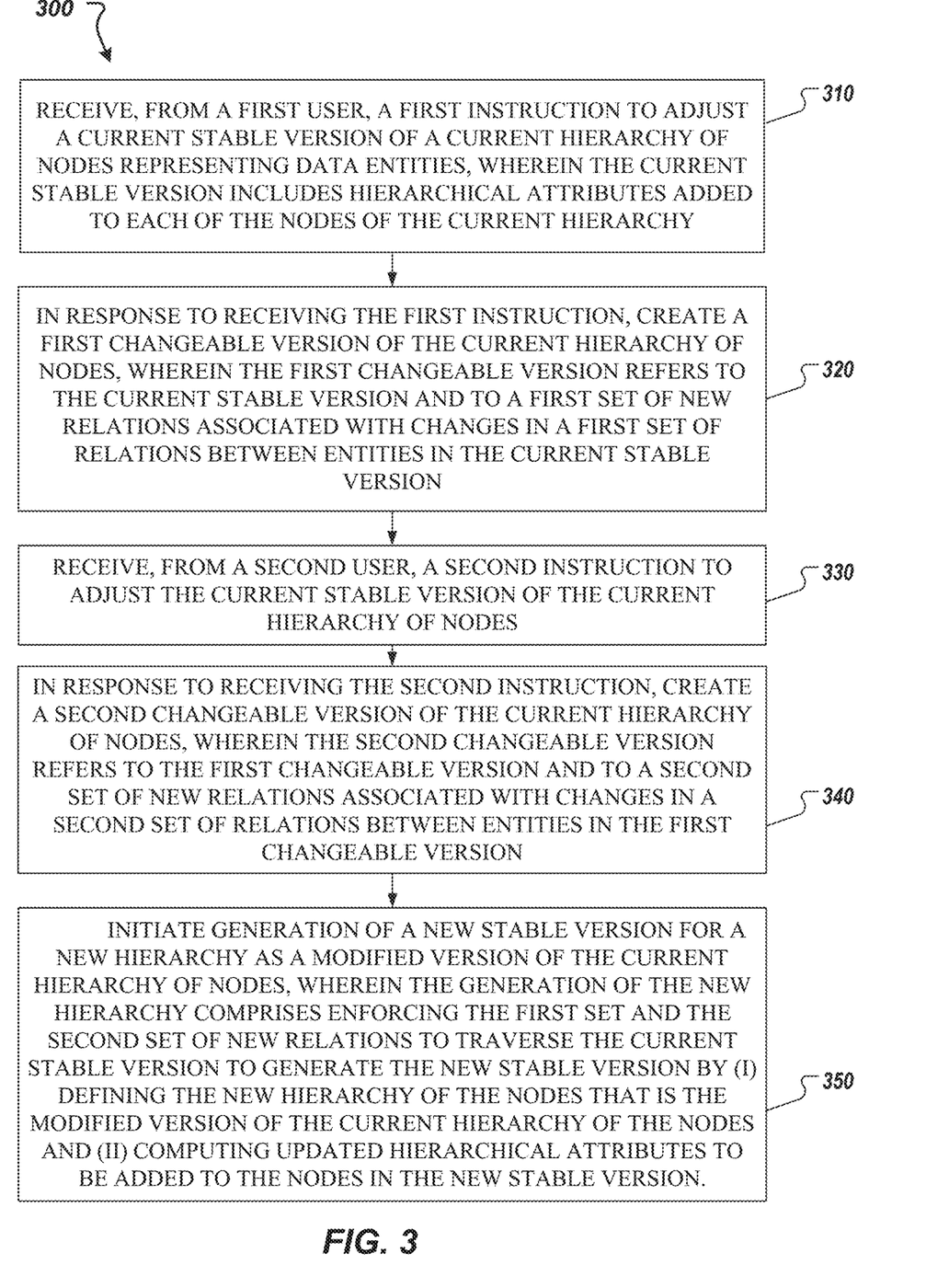
FIG. 3 is a flow diagram of a method for maintaining data hierarchies in accordance with implementations of the present disclosure.

FIG. 3 is a flow diagram of a method 300 for maintaining data hierarchies in accordance with implementations of the present disclosure. In some instances, the method 300 can be executed at a computing environment such as the computing environments 106 and/or 108, where data may be stored at database(s) and a user interface can be exposed to allow interaction with the data structure to change or modify the hierarchical relationships, where the modifications can be used to generate new hierarchical attributes to the structure in accordance with the present implementations.

At 310, a first instruction is received from a first user. The first instruction is to adjust a current stable version of a current hierarchy of nodes representing data entities. The current stable version includes hierarchical attributes added to each of the nodes of the current hierarchy.

In some instances, the current stable version of the current hierarchy can be generated to define a hierarchical organization between the nodes related in a tree structure. The generating of the current stable version can include generating stable metadata for each node of the hierarchy according to a relational data model for defining stable versions.

In some instances, a user interface of an application can provide a visual representation of the current stable version comprising visible nodes corresponding to data entities from the hierarchy. Such visual representation can be in an editable form that allows users such as the first and the second user to modify the hierarchy, for example, remove nodes, reposition nodes, add new nodes, etc.

At 320, in response to receiving the first instruction, a first changeable version of the hierarchy of nodes is created. The first changeable version refers to the current stable version and to a first set of new relations associated with changes in a first set of relations between entities in the current stable version.

At 330, a second instruction is received from a second user to adjust the current stable version of the hierarchy of nodes. In some instances, the first user and the second user can be the same user who perform subsequent actions to modify the hierarchy.

At 340, in response to receiving the second instruction, a second changeable version of the hierarchy of nodes is generated. The second changeable version refers to the first changeable version, and thus, through the first changeable version to the current stable version. Also, the second changeable version refers to a second set of new relations associated with changes in a second set of relations between entities in the first changeable version.

In some instances, the second set of new relations are defined to refer to first changeable version that refers also the current stable version as a single stable version reference. The second changeable version can refer to the first changeable version as a subsequent changed version of the current stable version, thus, to keep changes inheritance.

In some instances, the first or second changeable version can be generated to define a modification of the hierarchical organization between the nodes in the tree structure from the current stable version. Generating the first or second changeable versions comprises generating changeable metadata for at least a portion of the nodes of the hierarchy according to a relational data model for defining changeable version. The at least a portion of the nodes can be associated with a path between a node associated with the modification and a root node of the hierarchy of the current stable version. For example, the portion of the nodes can be defined as discussed in relation to FIG. 2A-2E that relate to creating a changeable version according to a data model and identifying the changes based on the defined model format.

In some instances, in response to receiving the second instruction, the triggered generation of a second stable version can be interrupted so that at to process the first and second instructions can be processed. The first and second instructions can be processed when applying changes to the current stable version to generate the updated stable version.

At 350, a generation of a new stable version of a new current hierarchy of nodes that is a modified version of the old current hierarchy. The generation is configured to enforce the first set and the second set of new relations to traverse the current stable version to generate relationships for the hierarchy as modified. The new stable version is generated by (i) generating the new hierarchy as the modified version of the current hierarchy of the nodes and (ii) computing updated hierarchical attributes to be added to the nodes in the updated stable version. The generation of the new stable version is In some instances, in response to generating the new stable version of the hierarchy, the new stable version can be defined as a current stable version instead and the current stable version that was modified at 310 can be deleted. In some instances, the new stable version can be defined as a current stable version while the previous current version is still accessible and can be used by at least some users (e.g., and based on requests and/or instructions received before its deletion).

In some instances, after the current stable version is determined, that version would be the one that would be used for execution of data queries based on data associated with the modified hierarchy.

In some instances, if a request to generate a report based on querying data from data entities represented in the hierarchy of nodes is received, a current stable version of the hierarchy of nodes can be identified, and queries to obtain data from the data entities can be executed according to the hierarchy defined for the current stable version to generate the report based on the request.

Multiple Parents

In some instances, in hierarchical structures a few exceptional situations are possible. For example, a node in a hierarchy can have multiple parents. For example, a node can be a child node in two or more relations with different parent node. In some instances, when determining the effective changes of a changeable hierarchy version for a basic change operation, care can be taken when determining the anchor nodes and when determining the path(s) from anchor nodes to the roots. Multiple parents can be considered for the child node and for the parent node of the changed relation, and for all items on the path to the roots. Multiple patent nodes can be handle according to the operations performed as described in Table 12.

TABLE 12

| Operation | Handling of Multiple Parents |
| --- | --- |
| Insert a new relation | All relations having the parent item of the new relation as child item are treated as anchor relations If a relation already exists having the child item of the new relation as child, then the child version of the existing relation is also used as child version of the new relation (instead of the latest version) |
| Delete a relation | All relations having the parent item of the deleted relation as child item are treated as anchor relations |
| Move a relation | All relations having the old or the new parent item of the moved relation as child item are treated as anchor relations |
| Path relation | All relations having the parent item of a path relation as child item are considered as path relations as well |

Cycles

In some instances, when traversing a path starting from a root relation along further parent/child relations, a cycle can be reached if a (multiple parents) node is encountered for the second time. Continuing the traversal could lead to an endless loop. Hierarchy traversal algorithms, used for creating stable hierarchy versions or for user interfaces, stop in such a case. In an optimized stable hierarchy version, it can be configured that the traversal may mark the last relation as cycle-closing relation, which can be leveraged in hierarchy evaluations. In case of hierarchy changes, all paths between anchor and root relations are considered. The multiple parent handling is sufficient to also cover cycles.

Orphans

If the parent node of a relation does not occur as a child node of any other relation, the relation is either a root or an orphan relation. There can be multiple options to consider an orphan relation in a hierarchy traversal, for example:

Ignore the orphan relation.
Add the orphan relation as a root relation
Adjust the orphan relation with the child item of the first or last root item as parent item The manner in which the orphan relation is to be considered can be configured and implemented in the traversal algorithm for creating a stable hierarchy version, for the user interface, and for determining the path in case of hierarchy changes. As soon as orphan relations are integrated in the traversal algorithms, the algorithms for creating a stable hierarchy version and processing hierarchy changes also work for hierarchies with orphans.

Figure 4:
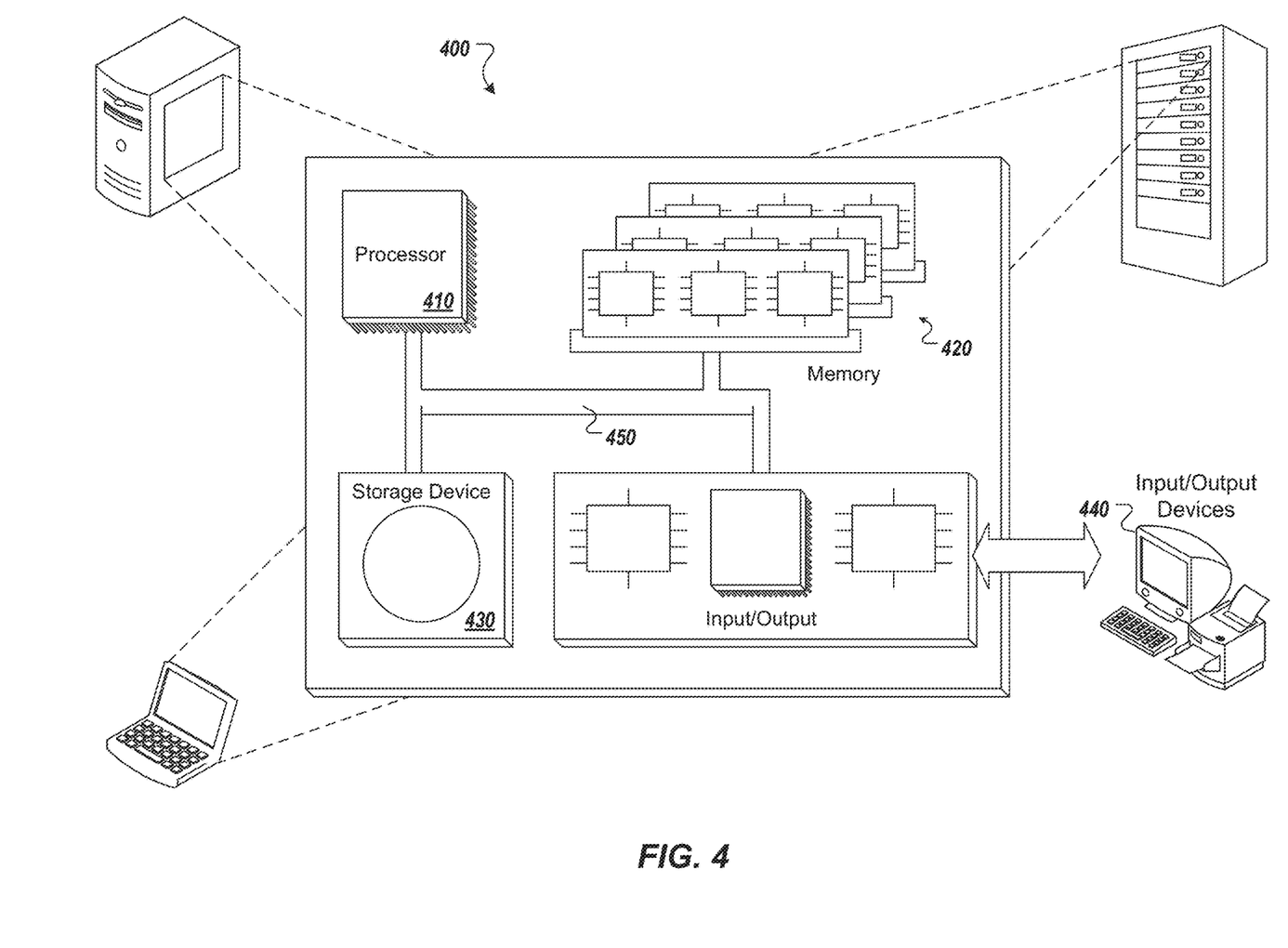
FIG. 4 is a schematic diagram of an example computer system that can be used to execute implementations of the present disclosure.

FIG. 4 is a schematic diagram of an example computer system 400 that can be used to execute implementations of the present disclosure. For example, the computer system 400 may be included in any or all of the server components discussed herein. The computer system 400 includes a processor 410, a memory 420, a storage device 430, and an input/output device 440. The components 410, 420, 430, and 440 are interconnected using a system bus 450. The processor 410 is capable of processing instructions for execution within the computer system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the computer system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the computer system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or combinations of these. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as sPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of these. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the one described. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Example 1. A computer-implemented method comprising:
receiving, from a first user, a first instruction to adjust a current stable version of a current hierarchy of nodes representing data entities, wherein the current stable version includes hierarchical attributes added to each of the nodes of the current hierarchy;
in response to receiving the first instruction, creating a first changeable version of the current hierarchy of nodes, wherein the first changeable version refers to the current stable version and to a first set of new relations associated with changes in a first set of relations between entities in the current stable version;
receiving, from a second user, a second instruction to adjust the current stable version of the current hierarchy of nodes;

in response to receiving the second instruction, creating a second changeable version of the current hierarchy of nodes, wherein the second changeable version refers to the first changeable version and to a second set of new relations associated with changes in a second set of relations between entities in the first changeable version; and initiating generation of a new stable version for a new hierarchy as a modified version of the current hierarchy of nodes, wherein the generation of the new hierarchy comprises enforcing the first set and the second set of new relations to traverse the current stable version to generate the new stable version by (i) defining the new hierarchy of the nodes that is the modified version of the current hierarchy of the nodes and (ii) computing updated hierarchical attributes to be added to the nodes in the new stable version.

Example 2. The method of Example 1, comprising:
in response to generating the new stable version with the modified version of the current hierarchy, defining the new stable version as the current stable version and deleting the current stable version as outdated Example 3. The method of any one of the preceding Examples, wherein, in response to the creating of the first changeable version, triggering a generation of a second stable version, wherein queries received during the generation of the second stable version are executed according to the modified version of the current hierarchy of nodes of the current stable version.

Example 4. The method of Example 3, comprising:
in response to receiving the second instruction, interrupting the triggered generation of the second stable version to process the first and second instructions together when applying changes to the current stable version to generate the new stable version.

Example 5. The method of Example 4, wherein the second instruction is received when a generation of a second stable version based on the first instruction is in progress.

Example 6. The method of any one of the preceding Examples, comprising:
presenting, at a user interface of an application, a visual representation of the current stable version comprising visible nodes corresponding to data entities from the current hierarchy.

Example 7. The method of any one of the preceding Examples, wherein the first instruction or the second instruction received from the first user is an instruction to add, remove, or change position of a node of the current hierarchy.

Example 8. The method of any one of the preceding Examples, wherein the first and the second user are the same users.

Example 9. The method 1 of any one of the preceding Examples, wherein the second set of new relations are defined to refer to the current stable version as a single stable version reference, and wherein the second changeable version refers to the first changeable version as a subsequent changed version of the current stable version.

Example 10. The method of any one of the preceding Examples, comprising:
generating the current stable version of the current hierarchy to define a hierarchical organization between the nodes related in a tree structure, wherein generating the current stable version comprises generating stable metadata for each node of the current hierarchy according to a relational data model for defining stable versions, and generating the first or second changeable version to define a modification of the hierarchical organization between the nodes in the tree structure from the current stable version, wherein generating the first or second changeable versions comprises generating changeable metadata for at least a portion of the nodes of the current hierarchy according to a relational data model for defining changeable version, wherein the at least a portion of the nodes are associated with a path between a node associated with the modification and a root node of the current hierarchy of the current stable version.

Example 11. The method of any one of the preceding Examples, comprising:
receiving a request to generate a report based on querying data from data entities represented in the current hierarchy of nodes;
identifying a current stable version of the current hierarchy of nodes; and
executing queries to obtain data from the data entities according to the current hierarchy defined for the current stable version to generate the report based on the request.

Example 12. A system comprising:
one or more processors; and
one or more computer-readable memories coupled to the one or more processors and having instructions stored thereon that are executable by the one or more processors to perform the method of any of Examples 1 to 11.

Example 13. A non-transitory, computer-readable medium coupled to one or more processors and having instructions stored thereon which, when executed by the one or more processors, cause the one or more processors to perform the method of any of Examples 1 to 11.

The invention claimed is:

1. A computer implemented method executed by at least one processor, the method comprising:
providing for display, by the at least one processor, and at a first user interface of a first application of a first user, a current stable version of a current hierarchy of nodes representing data entities stored in a database, wherein the current hierarchy of nodes is indicative of hierarchical relationships defined in a relational data model of the database;
receiving, from the first user and through the first user interface, a first instruction to adjust at least one hierarchical relationship for at least node represented in the current stable version, wherein adjusting the at least one hierarchical relationship comprises adjusting the relational data model for at least one data entity of the data entities stored in the database, wherein the current stable version includes hierarchical attributes added to each of the nodes of the current hierarchy, and wherein the hierarchical attributes of the current stable version correspond to the current hierarchy of nodes;
in response to receiving the first instruction, creating, by the at least one processor, a first changeable version of the current hierarchy of nodes, wherein the first changeable version refers to the current stable version and to a first set of new relations associated with changes in a first set of relations between entities in the current stable version;
receiving, from a second user, a second instruction to adjust the current stable version of the current hierarchy of nodes;
in response to receiving the second instruction, creating, by the at least one processor, a second changeable version of the current hierarchy of nodes, wherein the second changeable version refers to the first changeable version and to a second set of new relations associated with changes in a second set of relations between entities in the first changeable version;

initiating, by the at least one processor, generation of a new stable version for a new hierarchy as a modified version of the current hierarchy of nodes, wherein the generation of the new hierarchy comprises enforcing the first set and the second set of new relations to traverse the current stable version to generate the new stable version by (i) defining the new hierarchy of the nodes that is the modified version of the current hierarchy of the nodes and (ii) computing updated hierarchical attributes to be added to the nodes in the new stable version;

providing for display, by the at least one processor, and at the first user interface of the first application of the first user, the new stable version for the new hierarchy as the modified version of the current hierarchy of nodes; and in response to a selection from the first user of one or more nodes displayed as part of the new stable version for the new hierarchy, generating and executing, by the at least one processor, a request to invoke data from the database associated with the one or more data entities according to the updated hierarchical attributes for the nodes in the new stable version.

2. The method of claim 1, comprising:
in response to generating the new stable version with the modified version of the current hierarchy, defining the new stable version as the current stable version and deleting the current stable version as outdated.

3. The method of claim 1, wherein, in response to the creating of the first changeable version, triggering a generation of a second stable version, wherein requests received to invoke data from the database during the generation of the second stable version are executed according to the modified version of the current hierarchy of nodes of the current stable version.

4. The method of claim 3, comprising:
in response to receiving the second instruction, interrupting the triggered generation of the second stable version to process the first and second instructions together when applying changes to the current stable version to generate the new stable version.

5. The method of claim 4, wherein the second instruction is received when a generation of a second stable version based on the first instruction is in progress.

6. The method of claim 1, comprising:
presenting, at a user interface of an application, a visual representation of the current stable version comprising visible nodes corresponding to data entities from the current hierarchy.

7. The method of claim 1, wherein the first instruction or the second instruction received from the first user is an instruction to add, remove, or change position of a node of the current hierarchy.

8. The method of claim 1, wherein the first and the second user are the same users.

9. The method of claim 1, wherein the second set of new relations are defined to refer to the current stable version as a single stable version reference, and wherein the second changeable version refers to the first changeable version as a subsequent changed version of the current stable version.

10. The method of claim 1, comprising:
generating the current stable version of the current hierarchy to define a hierarchical organization between the nodes related in a tree structure, wherein generating the current stable version comprises generating stable metadata for each node of the current hierarchy according to a relational data model for defining stable versions, and generating the first or second changeable version to define a modification of the hierarchical organization between the nodes in the tree structure from the current stable version, wherein generating the first or second changeable versions comprises generating changeable metadata for at least a portion of the nodes of the current hierarchy according to a relational data model for defining changeable version, wherein the at least a portion of the nodes are associated with a path between a node associated with the modification and a root node of the current hierarchy of the current stable version.

11. A system comprising:
one or more processors; and
one or more computer-readable memories coupled to the one or more processors and having instructions stored thereon that are executable by the one or more processors to perform operations comprising:

providing for display and at a first user interface of a first application of a first user, a current stable version of a current hierarchy of nodes representing data entities stored in a database, wherein the current hierarchy of nodes is indicative of hierarchical relationships defined in a relational data model of the database;

receiving, from the first user and through the first user interface, a first instruction to adjust at least one hierarchical relationship for at least node represented in the current stable version, wherein adjusting the at least one hierarchical relationship comprises adjusting the relational data model for at least one data entity of the data entities stored in the database, wherein the current stable version includes hierarchical attributes added to each of the nodes of the current hierarchy, and wherein the hierarchical attributes of the current stable version correspond to the current hierarchy of nodes;

in response to receiving the first instruction, creating a first changeable version of the current hierarchy of nodes, wherein the first changeable version refers to the current stable version and to a first set of new relations associated with changes in a first set of relations between entities in the current stable version;

receiving, from a second user, a second instruction to adjust the current stable version of the current hierarchy of nodes;

in response to receiving the second instruction, creating a second changeable version of the current hierarchy of nodes, wherein the second changeable version refers to the first changeable version and to a second set of new relations associated with changes in a second set of relations between entities in the first changeable version;

initiating generation of a new stable version for a new hierarchy as a modified version of the current hierarchy of nodes, wherein the generation of the new hierarchy comprises enforcing the first set and the second set of new relations to traverse the current stable version to generate the new stable version by (i) defining the new hierarchy of the nodes that is the modified version of the current hierarchy of the nodes and (ii) computing updated hierarchical attributes to be added to the nodes in the new stable version;

providing for display and at the first user interface of the first application of the first user, the new stable version for the new hierarchy as the modified version of the current hierarchy of nodes; and in response to a selection from the first user of one or more nodes displayed as part of the new stable version for the new hierarchy, generating and executing a request to invoke data from the database associated with the one or more data entities according to the updated hierarchical attributes for the nodes in the new stable version.

12. The system of claim 11, wherein the one or more computer-readable memories store instructions, which when executed by the one or more processors perform operations comprising:

in response to generating the new stable version with the modified version of the current hierarchy, defining the new stable version as the current stable version and deleting the current stable version as outdated.

13. The system of claim 11, wherein, in response to the creating of the first changeable version, triggering a generation of a second stable version, wherein queries requests received to invoke data from the database during the generation of the second stable version are executed according to the modified version of the current hierarchy of nodes of the current stable version.

14. The system of claim 13, wherein the one or more computer-readable memories store instructions, which when executed by the one or more processors perform operations comprising:

in response to receiving the second instruction, interrupting the triggered generation of the second stable version to process the first and second instructions together when applying changes to the current stable version to generate the new stable version.

15. The system of claim 14, wherein the second instruction is received when a generation of a second stable version based on the first instruction is in progress.

16. A non-transitory, computer-readable medium coupled to one or more processors and having instructions stored thereon which, when executed by the one or more processors, cause the one or more processors to perform operations comprising:

providing for display and at a first user interface of a first application of a first user, a current stable version of a current hierarchy of nodes representing data entities stored in a database, wherein the current hierarchy of nodes is indicative of hierarchical relationships defined in a relational data model of the database;

receiving, from the first user and through the first user interface, a first instruction to adjust at least one hierarchical relationship for at least node represented in the current stable version, wherein adjusting the at least one hierarchical relationship comprises adjusting the relational data model for at least one data entity of the data entities stored in the database, wherein the current stable version includes hierarchical attributes added to each of the nodes of the current hierarchy, and wherein the hierarchical attributes of the current stable version correspond to the current hierarchy of nodes;

in response to receiving the first instruction, creating a first changeable version of the current hierarchy of nodes, wherein the first changeable version refers to the current stable version and to a first set of new relations associated with changes in a first set of relations between entities in the current stable version;

receiving, from a second user, a second instruction to adjust the current stable version of the current hierarchy of nodes;

in response to receiving the second instruction, creating a second changeable version of the current hierarchy of nodes, wherein the second changeable version refers to the first changeable version and to a second set of new relations associated with changes in a second set of relations between entities in the first changeable version;

initiating generation of a new stable version for a new hierarchy as a modified version of the current hierarchy of nodes, wherein the generation of the new hierarchy comprises enforcing the first set and the second set of new relations to traverse the current stable version to generate the new stable version by (i) defining the new hierarchy of the nodes that is the modified version of the current hierarchy of the nodes and (ii) computing updated hierarchical attributes to be added to the nodes in the new stable version;

providing for display and at the first user interface of the first application of the first user, the new stable version for the new hierarchy as the modified version of the current hierarchy of nodes; and in response to a selection from the first user of one or more nodes displayed as part of the new stable version for the new hierarchy, generating and executing a request to invoke data from the database associated with the one or more data entities according to the updated hierarchical attributes for the nodes in the new stable version.

17. The non-transitory, computer-readable medium of claim 16, further storing instructions, which when executed by the one or more processors perform operations comprising:

in response to generating the new stable version with the modified version of the current hierarchy, defining the new stable version as the current stable version and deleting the current stable version as outdated.

18. The non-transitory, computer-readable medium of claim 16, wherein, in response to the creating of the first changeable version, triggering a generation of a second stable version, wherein requests received to invoke data from the database during the generation of the second stable version are executed according to the modified version of the current hierarchy of nodes of the current stable version.

19. The non-transitory, computer-readable medium of claim 18, further storing instructions, which when executed by the one or more processors perform operations comprising:

in response to receiving the second instruction, interrupting the triggered generation of the second stable version to process the first and second instructions together when applying changes to the current stable version to generate the new stable version.

\* \* \* \* \*